Jan. 19, 1960 A. C. EISENHART 2,921,820
OIL COMPARATOR
Filed Aug. 5, 1957 2 Sheets-Sheet 1
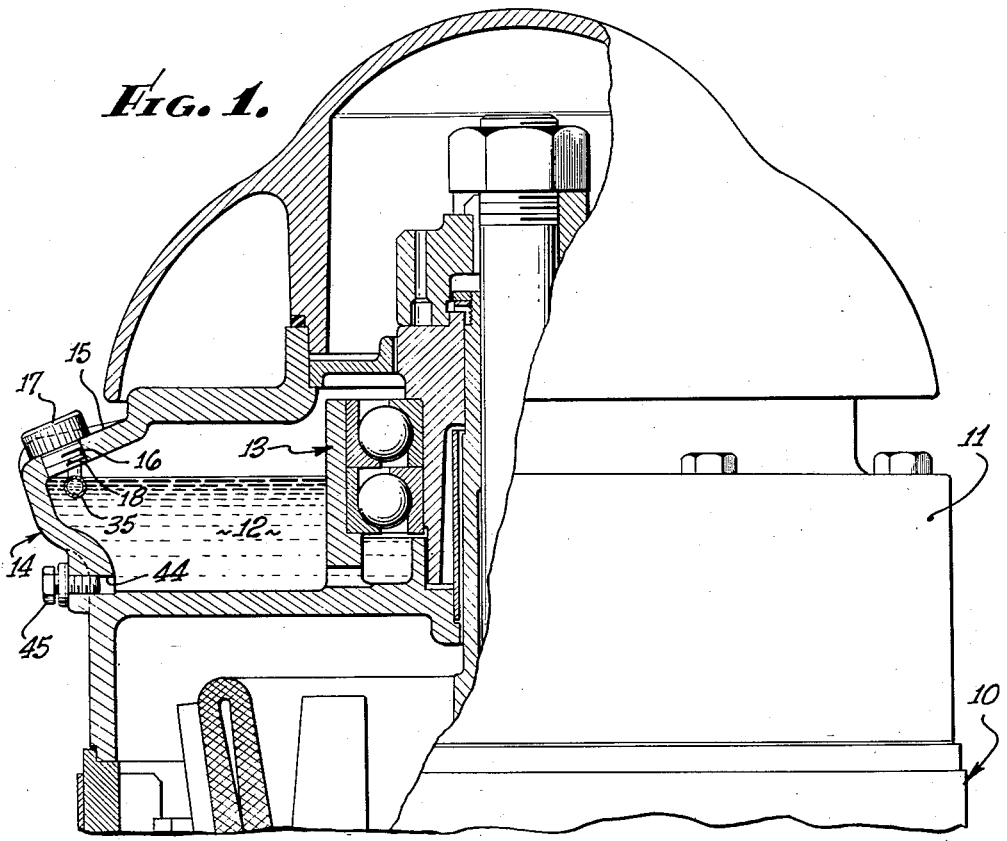
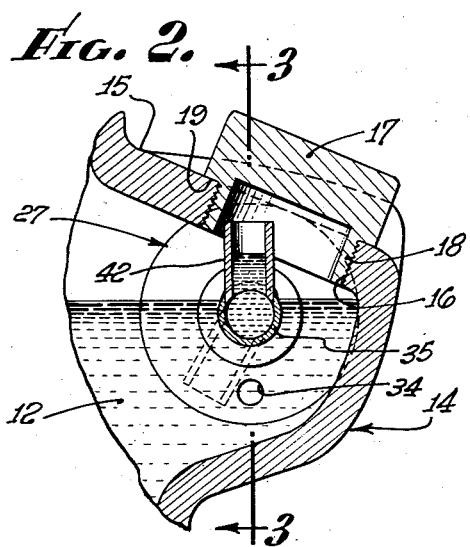
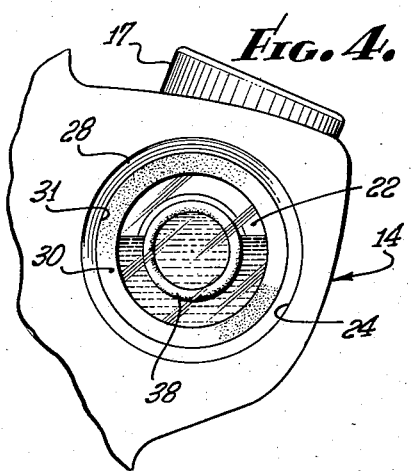
INVENTOR.
ARLIN C. EISENHART,
BY
Flam and Flam
ATTORNEYS.

Jan. 19, 1960 A. C. EISENHART 2,921,820
OIL COMPARATOR
Filed Aug. 5, 1957 2 Sheets-Sheet 2
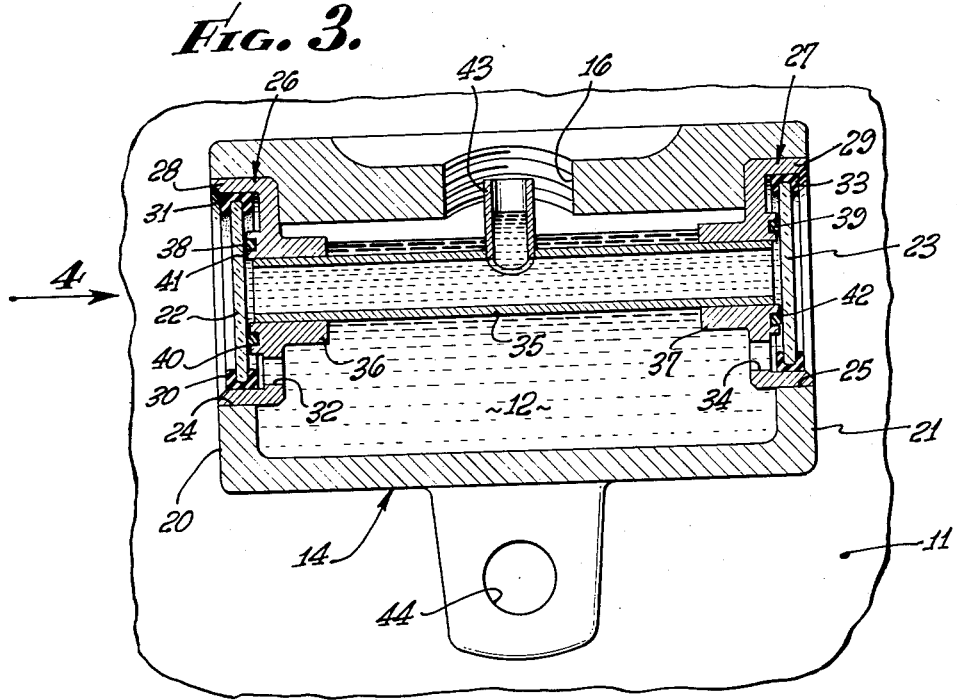
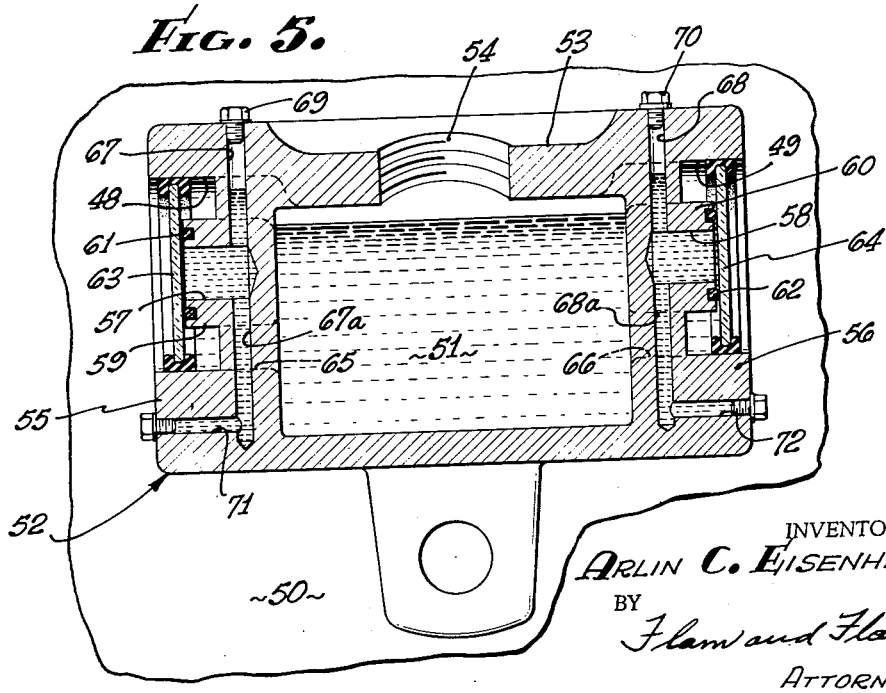
INVENTOR.
ARLIN C. EISENHART,
BY
Flam and Flam
ATTORNEYS.

United States Patent Office 2,921,820
Patented Jan. 19, 1960

2,921,820

OIL COMPARATOR

Arlin C. Eisenhart, Fullerton, Calif., assignor to U.S. Electrical Motors, Inc., Los Angeles, Calif., a corporation of California Application August 5, 1957, Serial No. 676,332

10 Claims. (Cl. 308—187)

This invention relates to lubrication systems utilizing a lubricant reservoir. Particularly this invention relates to inspection of the lubricant in the reservoir for purposes of determining whether or not a change of lubricant is required.

Although various lubricants may, when new, have different colors, all lubricants change color due to deterioration, collection of foreign particles and the like. However, a particular color may mean entirely different things for different lubricants.

The primary object of this invention is to provide a simple color comparator as a part of the apparatus in which a sample of the lubricant inserted into the reservoir is isolated and maintained as a visual reference.

Another object of this invention is to provide a simple window arrangement whereby the lubricant in the main body of the reservoir and in the isolated portion may readily be visually compared.

This invention possesses many other advantages, and has other objects which may be made more clearly apparent from a consideration of several embodiments of the invention. For this purpose, there are shown a few forms in the drawings accompanying and forming part of the present specification. These forms will now be described in detail, illustrating the general principles of the invention; but it is to be understood that this detailed description is not to be taken in a limiting sense, since the scope of the invention is best defined by the appended claims.

Referring to the drawings:

Figure 1 is a fragmentary elevation, showing, by way of example, a pump motor incorporating the present invention;

Fig. 2 is an enlarged detail section, showing a part of the apparatus of Fig. 1;

Fig. 3 is an enlarged sectional view, taken along the plane indicated by line 3—3 of Fig. 2;

Fig. 4 is a fragmentary end view of the apparatus, and taken in the direction indicated by the arrow 4 in Fig. 3; and Fig. 5 is a view similar to Fig. 3, illustrating a modified structure.

The motor casing 10 shown in Fig. 1 has an upper end bracket 11 in which a bearing structure 13 is supported. The bracket provides a lubricant reservoir adjoining the bearing structure 13. The bracket 11 provides an embossment or crown 14 which serves in part to define the walls of the reservoir. This embossment has an upper sloping ledge 15 (see also Fig. 2) provided with a threaded opening 16 for insertion of a lubricant into the reservoir 12. A cap 17 has a reduced threaded extension 18 insertable into the opening 16. A shoulder 19, formed by the reduced extension 18, determines the closed position of the cup 17.

As shown most clearly in Fig. 3, the embossment 14 has side walls 20 and 21 extending generally in a vertical plane. Transparent windows 22 and 23, located at openings 24 and 25 in the side walls 20 and 21, serve as a means whereby the lubricant in the reservoir 12 may be perceived. Indication markings on the windows 22 and 23 provide a level gauge.

For mounting the windows 22 and 23, identical brackets 26 and 27 are provided. These brackets 26 and 27 each have a bell flange 28 and portion 29 respectively press-fitted in the openings 24 and 25. An elastic or other suitable ring gasket 30 extends peripherally of the window 22 and is confined within the cylindrical internal surface 31 of the bell flange 28. The gasket 30 provides a seal between the window 22 and the bracket 26.

Lubricant in the main body of the reservoir 12 passes to the rear surface of the window 22 via an opening 32 at the base of the bell flange 28.

The window 23 is similarly supported in a gasket 33 at the bracket 27, and an opening 34 is likewise provided in the base of the bell flange 29 of the bracket 27. The main body of lubricant can thus be inspected from either side of the machine.

A portion of the lubricant inserted through the opening 16 is isolated from the remainder of the reservoir 12 in order to serve as a reference for later comparison. A tube 35 forms an isolated space for this purpose. The tube 35 is rotatably supported at opposite ends in central hubs 36 and 37 provided by the brackets 26 and 27. The lubricant in the tube 35 is thus visible at the central areas of the windows 22 and 23.

The ends of the tube 35 are spaced from the windows 22 and 23. In order to prevent passage of lubricant in the tube 35 to the main body of lubricant in the reservoir 12 at the rear surface of the window 22, O-rings 38 and 39 are provided.

The O-ring 38, for example, is accommodated in an annular groove 40 in the outwardly facing end surface 41 of the hub 36. The O-ring 38 thus extends in encompassing relationship with respect to the tube 35. A portion of the O-ring 38 projects outwardly beyond the groove 40 and annularly engages, in sealing relation, the rear surface of the window 22. In order to ensure appropriate cooperation between the O-ring 38 and the window 22, allowing for the width of the sealing gasket 30, the base of the bell flange 28 is joined to the hub 36 at a place intermediate its length such that clearance is provided for the gasket 30 at the base of the flange 28.

The O-ring 39 is similarly supported in a groove 42 and serves to define an isolated area at the center of the window 23 at the end of the tube 35.

In order to supply lubricant to the isolated space defined by the tube 35, a nipple 43 is provided. This nipple 43 extends at right angles from the center of the tube 35 and in alignment with the opening 16. The nipple projects upwardly into the opening 16 for receiving a portion of the inserted lubricant.

Before fresh lubricant is supplied to the reservoir 12, the tube 35 is first emptied. As shown in phantom lines in Fig. 2, this is accomplished by rotating the tube such that the nipple projects downwardly. Lubricant in the tube 35, as well as all lubricant previously in the reservoir 12, is drained through a drain outlet 44 normally closed by a plug 45. The nipple 43 is then vertically upwardly oriented. The nipple 43 is readily accessible for manipulation through the opening 16. Fresh lubricant is then inserted.

When the cap 17 is in place, the reduced extension 18 thereof (Fig. 2) prevents undesired movement of the nipple 43 to discharging position. However, when the cap 17 is removed, the end of the nipple 43 readily clears the edge of the opening 16. In the present instance, the nipple clears only the inwardly located edges of the opening 16. Vibration accordingly cannot cause the nipple to move downwardly.

As shown most clearly in Fig. 4, the condition of the lubricant in the main body of the reservoir is determined by comparing the annular area of the window to the central area of the window.

In the form shown in Fig. 5, a slightly different arrangement is provided. In this instance, the casing part 50 provides a lubricant reservoir 51. An embossment or crown 52 provides a ledge 53 having an opening 54 for insertion of lubricant. At side walls 55 and 56 of the crown, there are flanges 59 and 60 projecting centrally from the bottom of recesses 48 and 49. The flanges 59 and 60 define spaces 57 and 58 in which unused reference lubricant is isolated. The annular flanges 59 and 60 carry O-rings 61 and 62 cooperable with the internal surfaces of the transparent windows 63 and 64 to close the outer ends of the spaces 57 and 58. The windows 63 and 64 fit within the recesses 48 and 49. The peripheral area of the window 63 is exposed to the main body of lubricant in the reservoir 51 via an opening 65. An opening 66 is similarly provided for the window 64 at the opposite side wall 56.

In the present instance, fresh lubricant is supplied to the recesses 57 and 58 via vertical passages 67 and 68 respectively opening at the top of each space 57 and 58. Horizontal drain passages 71 and 72 for the recesses 57 and 58 are provided at the side walls beneath the recesses 48 and 49. These drain passages intersect continuations 67a and 68a of the passages 67 and 68 extending below the spaces 57 and 58. The spaces 57 and 58 are drained and filled at the same time as is the reservoir 51. A readily visible reference is thus provided for ascertaining the condition of lubricant in the reservoir 51.

The inventor claims:

1. In a lubrication system for a bearing or the like: wall means forming a lubricant reservoir, and having an opening; a transparent window located at the opening for inspection of lubricant in the reservoir; means forming a space isolated from the reservoir and bounded by a portion of the interior surface of the window; means for inserting lubricant into the reservoir and into said space; and means for draining both the reservoir and the space.

2. In a lubrication system for a bearing or the like: wall means forming a lubricant reservoir, and having an opening; a transparent window located at the opening for inspection of lubricant in the reservoir; means forming a space isolated from the reservoir and bounded by a portion of the interior surface of the window; means forming an inlet opening to the reservoir; means forming an inlet opening into said space and located in registry with the inlet opening to the reservoir; and means for draining both the reservoir and the space.

3. In a lubrication system for a bearing or the like: wall means forming a lubricant reservoir, and having an opening; a transparent window located at the opening; a hollow member having an open end located at the interior of the window; means establishing a seal between a portion of the interior surface of the window and said open end of said member, and exposing other portions of said surface to the reservoir; said wall means having an inlet located above said open end of said member; said member having an open portion in alignment with said inlet; and means mounting said member for angular movement whereby said open portion may project downwardly to discharge the contents of the member and to project upwardly in registry with said inlet to conduct a portion of the lubricant entering the reservoir into said member.

4. In a lubrication system for a bearing or the like: wall means forming a lubricant reservoir, and having an opening; a transparent window located at the opening; a hollow member having an open end located at the interior of the window; means establishing a seal between a portion of the interior surface of the window and said open end of said member, and exposing other portions of said surface to the reservoir; said wall means having an inlet located above said open end of said member; said member having an open portion in alignment with said inlet; means mounting said member for angular movement whereby said open portion may project downwardly to discharge the contents of the member and to project upwardly in registry with said inlet to conduct a portion of the lubricant entering the reservoir into said member; and a closure for said inlet and cooperable with said open portion to limit the angular movement of said open portion.

5. In a lubrication system for a bearing or the like: wall means forming a lubricant reservoir; said wall means having openings horizontally aligned with respect to each other at spaced locations along the wall means; brackets for the respective openings and each having a cup flange portion fitting the corresponding opening and facing outwardly; each of the brackets having a through apertured hub portion; a tubular member journaled at opposite ends in the hub portions of the respective brackets, and extending across the reservoir; means forming in the wall means an inlet into the reservoir and located above an intermediate portion of the tubular member; said tubular member having an opening capable of alignment with said inlet when the tubular member is angularly oriented to locate the opening upwardly; a window for each flange; and an O-ring for each window effective to establish a seal between the corresponding end of the tubular member and a centrally located area of the window; each flange having an opening to admit the lubricant of the reservoir to the other areas of the corresponding window.

6. In a lubrication system for a bearing or the like: wall means forming a lubricant reservoir; said wall means having openings horizontally aligned with respect to each other at spaced locations along the wall means; brackets for the respective openings and each having a cup flange portion fitting the corresponding opening and facing outwardly; each of the brackets having a through apertured hub portion; a tubular member journaled at opposite ends in the hub portions of the respective brackets, and extending across the reservoir; means forming in the wall means an inlet into the reservoir and located above an intermediate portion of the tubular member; said tubular member having an opening capable of alignment with said inlet when the tubular member is angularly oriented to locate the opening upwardly; a window for each flange; an O-ring for each window effective to establish a seal between the corresponding end of the tubular member and a centrally located area of the window; each flange having an opening to admit the lubricant of the reservoir to the other areas of the corresponding window; and a movable closure for said inlet and having means forming an interlock with said tubular member normally to prevent movement of the tubular member to a position in which its opening is located downwardly.

7. In a lubrication system for a bearing or the like: wall means forming a lubricant reservoir; said wall means having openings horizontally aligned with respect to each other at spaced locations along the wall means; brackets for the respective openings and each having a cup flange portion fitting the corresponding opening and facing outwardly; each of the brackets having a through apertured hub portion; a tubular member journaled at opposite ends in the hub portions of the respective brackets, and extending across the reservoir; means forming in the wall means an inlet into the reservoir and located above an intermediate portion of the tubular member; said tubular member having an opening capable of alignment with said inlet when the tubular member is angularly oriented to locate the opening upwardly; an O-ring mounted about the outer end of each hub; and a window for each flange and engageable with the corresponding O-ring to seal off a centrally located area of the window and the corresponding end of said tubular member; each bracket having an opening to admit the lubricant of the reservoir to the other areas of the corresponding window.

8. In a lubrication system for a bearing or the like: wall means forming a lubricant reservoir; said wall means having openings horizontally aligned with respect to each other at spaced locations along the wall means; brackets for the respective openings and each having a cup flange portion fitting the corresponding opening and facing outwardly; each of the brackets having a through apertured hub portion; a tubular member journaled at opposite ends in the hub portions of the respective brackets, and extending across the reservoir; means forming in the wall means an inlet into the reservoir and located above an intermediate portion of the tubular member; said tubular member having an opening capable of alignment with said inlet when the tubular member is angularly oriented to locate the opening upwardly; the outer end of each hub projecting outwardly from the base of the corresponding flange, and having an annular recess; an O-ring for each annular recess; a window for each flange; and a gasket extending peripherally of each window for establishing a seal between the window and the flange; the central area of each window being engageable with the corresponding O-ring to seal off the corresponding end of said tubular member; each bracket having an opening to admit lubricant of the reservoir to the areas of the corresponding window about the corresponding O-ring.

9. In a lubrication system for a bearing or the like: wall means forming a lubricant reservoir; said wall means having adjoining outwardly facing recesses; a window carried by the wall means and overlying both recesses; means sealing one of the recesses about one area of the window; means conducting the lubricant in the reservoir to the other recess; and means for admitting lubricant into the said one recess and into the reservoir; said admitting means being so formed and located as to isolate said one recess from the main body of the reservoir.

10. The combination as set forth in claim 1, in which the isolated space is provided with an inlet, and the reservoir is provided with an inlet, said inlets being independent of each other, whereby either can be used without using the other.

References Cited in the file of this patent

UNITED STATES PATENTS

| | | |
|---|---|---|
| 1,706,001 | Shapiro | Mar. 19, 1929 |
| 1,806,423 | Shapiro | May 19, 1931 |
| 2,037,213 | Cannon | Apr. 14, 1936 |